US006138986A

United States Patent [19]

Krimmer et al.

[11] Patent Number: 6,138,986

[45] Date of Patent: Oct. 31, 2000

[54] SOLENOID VALVE FOR A FUEL INJECTION SYSTEM FOR A VEHICLE

[75] Inventors: Erwin Krimmer, Pluederhausen; Tilman Miehle, Kernen, both of Germany

[73] Assignee: Robert Bosh GmbH, Stuttgart, Germany

[21] Appl. No.: 09/228,189

[22] Filed: Jan. 11, 1999

[30] Foreign Application Priority Data

Jan. 12, 1998 [DE] Germany ........................ 298 00 347 U

[51] Int. Cl.[7] ........................................................ F16K 31/02

[52] U.S. Cl. ................................ 251/129.02; 251/129.14

[58] Field of Search .......................... 251/129.15, 129.14, 251/129.02

[56] References Cited

U.S. PATENT DOCUMENTS 4,251,052 2/1981 Hertfelder et al. ................ 251/129.02

FOREIGN PATENT DOCUMENTS 451 227 B1 12/1994 European Pat. Off. .

*Primary Examiner*—Kevin Lee

*Attorney, Agent, or Firm*—Ronald E. Greigg; Edwin E. Greigg

[57] ABSTRACT

A 2/2-way solenoid valve which is open when it is without current and is inserted into a diesel fuel-carrying line to a high-pressure pump. The solenoid valve functions as an emergency shutoff or when the device is tested by supplying the solenoid valve with power which then closes the line to a high-pressure pump, which interrupts the high-pressure delivery. The solenoid valve has an armature, which functions in an armature chamber that is filled with diesel fuel and is sealed in relation to the outside by two O-rings. A plastic valve housing protects the coil and the contacting of the electrical connections from corrosion and protects the individual wires of the coil from vibration stresses. The solenoid valve is designated for use in common rail injection systems of vehicular internal combustion engines.

7 Claims, 1 Drawing Sheet

SOLENOID VALVE FOR A FUEL INJECTION SYSTEM FOR A VEHICLE

BACKGROUND OF THE INVENTION

The invention relates to a solenoid valve for a fuel system of an engine. A solenoid valve of this kind is known, (EP 0 451 227 B1).

Such valves that are closed when they are without current in order to prevent the danger of racing an internal combustion engine. Solenoid valves of this kind place a relatively high strain on the control device. The solenoid valve interrupts the diesel fuel flow from a gear delivery pump to the high-pressure pump. This kind of danger of racing exists, for example, when an annular slide valve in the pump work chamber jams, but also when due to injection adjustment, the feed stroke of the high-pressure pump piston occurs too late with regard to its rotational position so that the filling grooves already produce the connection between the pump work chamber and intake line in the top dead center of the pump piston or earlier.

OBJECT AND SUMMARY OF THE INVENTION

The solenoid valve according to the invention has the advantage over the prior art that less of a strain is placed on the control device carrying out the triggering because the solenoid valve only has to be activated in case of emergency and for functional control. Furthermore, it is advantageous that the armature of the solenoid valve floats in the diesel fuel flow and is disposed in a brass sleeve, which is reliably sealed off from the outside, particularly in relation to the coil.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 2:
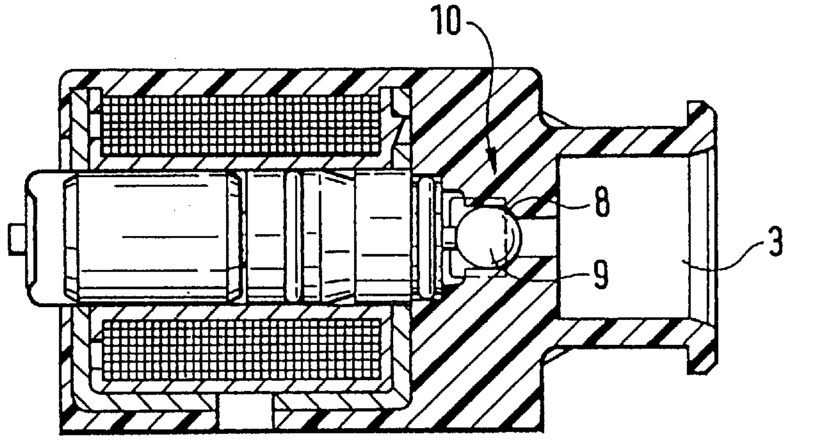
FIG. 2 shows a section along line II—II in FIG. 1.
Figure 1:
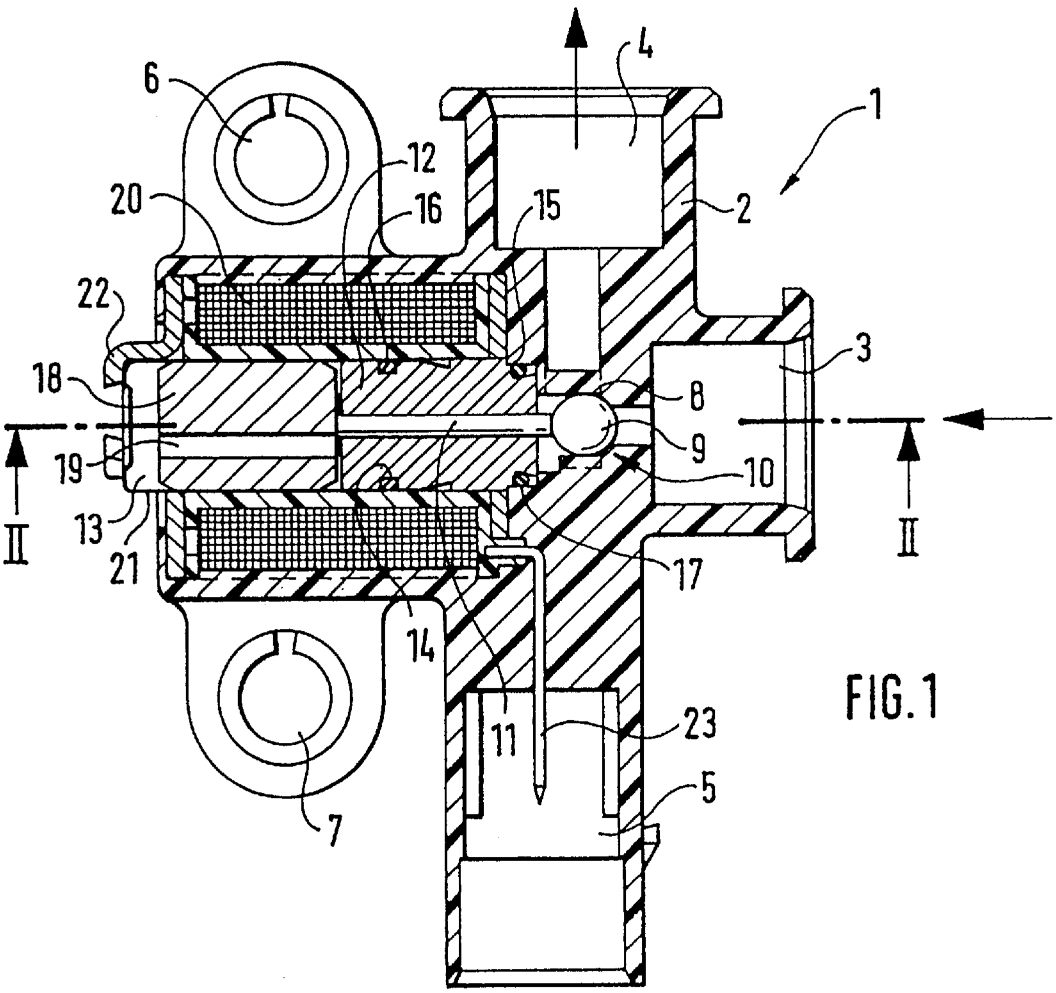
FIG. 1 shows the solenoid valve in a sectional view.

The solenoid valve 1 has an injection-molded valve housing 2 with a valve inlet 3 and a valve outlet 4, which are both embodied as connection fittings for corresponding inflow and outflow lines. Furthermore, a receptacle 5 for an electrical connection as well as two fastening tabs 6 and 7 are also connected to the valve housing 2.

A valve 10 that is comprised of a valve seat 8 and a valve closing body 9 is disposed between the valve inlet 3 and the valve outlet 4, wherein the valve seat 8 is formed onto the inner end of the valve inlet 3 and the valve closing body 9 is a ball, which can be placed against the valve seat 8 in a sealing fashion and therefore blocks the passage to the valve outlet 4.

The valve closing body 9 is actuated by means of a valve tappet 11, which passes through a guide sleeve 12 and protrudes into an armature chamber 13. On its circumferential surface, the guide sleeve 12 has two annular grooves 14 and 15 into which O-rings 16 and 17 are respectively inserted. The armature chamber 13 is filled with diesel fuel and contains an armature 18, which can act on the valve tappet 11. The armature 18 has a compensation bore 19 that runs parallel to the axis, via which the fluid can travel from one side of the armature 18 to the other. The armature 18 and armature chamber 13 are sealed off in relation to the outside and in particular in relation to a coil 20 by a cup-shaped brass sleeve 21, on which o-ring 16 rests in a sealed fashion.

A bracket 22 represents a magnetic connection. An electrical connection 23 is used to supply power to the coil 20. It is embedded into the valve housing 2 that encloses the individual parts of the solenoid valve 1 and this valve housing is manufactured out of plastic in an injection molding process. The extrusion coating assures a protection of the contacting of the electrical connections from corrosive environmental influences. In addition, the extrusion coating also protects the coil 20 from corrosive environmental influences and from the vibrational stresses that particularly occur in a common rail system by virtue of the fact that the individual wires are fixed in place and cannot rub against one another.

The attachment of the guide sleeve 12 and the brass sleeve 21 is achieved by a folding of tabs that are integrated into the bracket 22. The mechanical holding together of all fixed valve parts, the production of the electrical and hydraulic connections, as well as the formation of the two fastening tabs 6 and 7 are achieved in the injection molding process for manufacturing the plastic valve housing 2.

MANNER OF FUNCTION

The solenoid valve 1 is inserted into a supply line from a gear high-pressure pumps not shown, to a common rail high-pressure pump, likewise not shown. In order to interrupt the diesel fuel flow for the purpose of switching off the common rail of the diesel engine in the event of an emergency or for testing purposes, the solenoid valve 1 is switched from its normal open position into the closed position. In this connection, it functions as a 2/2-way solenoid valve.

The force for the closing of the solenoid valve 1 is generated by means of supplying power to the coil 20 and by means of a corresponding magnetic field. The magnetic flux is conducted by way of the bracket 22, the guide sleeve 12, and the armature 18. The armature 18 is thereby pulled in the direction of the guide sleeve 12. By way of the valve tappet 11, the tappet presses against the valve closing body 9 and moves the valve closing body against its valve seat 8. When the valve 10 is closed, the diesel fuel flow to the high-pressure pump is interrupted.

When the power supply is switched off, the valve closing body 9, the valve tappet 11, and the armature 18 are moved back by the lower hydraulic pressure of the delivery pump and the solenoid valve 1 opens again. The low pressure that the delivery pump produces, approximately 2 bar, then prevails inside the solenoid valve 1. The armature chamber 13 is sealed in relation to the outside by the two O-rings 16 and 17 and by the guide sleeve 12 toward the valve housing 2. The other seal is produced by the guide sleeve 12, the O-ring 16, and the brass sleeve 21.

The switching principle of being open when without current has the advantage that only a slight strain is placed on the electronic control device that monitors the electrical switching procedures, in fact only in the event of an emergency or for functional control. Furthermore, this type of actuation produces the advantage that an optimal exploitation of the magnetic energy is assured by virtue of the fact that the magnet has the highest force in the switched off position.

The foregoing relates to preferred exemplary embodiments of the invention, it being understood that other variants and embodiments thereof are possible within the spirit and scope of the invention, the latter being defined by the appended claims.

What is claimed is:

1. A solenoid valve for monitoring diesel fuel flow through a supply line to a high-pressure pump which pumps fuel to a common rail injection system of an internal combustion engine, in which the solenoid valve is a 2/2-way solenoid valve comprising a solenoid in a magnet chamber, an armature (18), a valve tappet (11) and a valve dosing body (9), said valve closing body is moveable by said solenoid via said armature and said valve tappet against a fuel flow to move the valve closing body to a valve seat for closing the valve, said valve tappet protrudes through a guide sleeve (12) into an armature chamber (13) receiving said armature and said valve tappet, said armature and said magnet chamber are exposed to a flow of the diesel fuel downstream of the valve seat and sealed in relation to an outside by means of at least one O-ring (16, 17).

2. A solenoid valve according to claim 1, in which the fuel-filled armature chamber (13) is disposed in a cup-shaped brass sleeve (21) that is sealed by means of said at least one O-ring (16).

3. A solenoid valve according to claim 1, in which the guide sleeve (12) that contains the valve tappet (11) has two annular grooves (14, 15) on a circumferential surface for containing respective O-rings (16) and (17).

4. A solenoid valve according to claim 2, in which the guide sleeve (12) that contains the valve tappet (11) has two annular grooves (14, 15) on a circumferential surface for containing respective O-rings 16) and (17).

5. A solenoid valve according to claim 1, in which the solenoid valve (1) is disposed in a plastic valve housing (2) that is manufactured as an injection-molded part that protects parts of the solenoid valve.

6. A solenoid valve according to claim 2, in which the solenoid valve (1) is disposed in a plastic valve housing (2) that is manufactured as an injection-molded part that protects parts of the solenoid valve.

7. A solenoid valve according to claim 3, in which the solenoid valve (1) is disposed in a plastic valve housing (2) that is manufactured as an injection-molded part that protects parts of the solenoid valve.

* * * * *